US008676051B2

(12) United States Patent
Tsukada (10) Patent No.: US 8,676,051 B2
(45) Date of Patent: Mar. 18, 2014

(54) FOCUS DETECTION DEVICE, FOCUS DETECTION METHOD, AND CAMERA (75) Inventor: Shinichi Tsukada, Yokohama (JP)

(73) Assignee: Nikon Corporation, Tokyo (JP)

( * ) Notice: Subject to any disclaimer, the term of this patent is extended or adjusted under 35 U.S.C. 154(b) by 865 days.

(21) Appl. No.: 12/355,409

(22) Filed: Jan. 16, 2009

(65) Prior Publication Data

US 2009/0185798 A1 Jul. 23, 2009

(30) Foreign Application Priority Data

Jan. 23, 2008 (JP) .................................. 2008-012347

(51) Int. Cl.
G03B 13/34 (2006.01)

(52) U.S. Cl.
USPC .......................................... 396/123; 348/345

(58) Field of Classification Search
USPC ............ 396/80, 123; 348/208.1, 208.14, 348, 348/349
See application file for complete search history.

(56) References Cited

U.S. PATENT DOCUMENTS

| 5,258,801 | A * | 11/1993 | Kusaka et al. | 396/123 |
| 5,748,802 | A * | 5/1998 | Winkelman | 382/271 |
| 6,157,782 | A * | 12/2000 | Aoyama | 396/104 |
| 6,670,992 | B2 * | 12/2003 | Irie | 348/350 |
| 7,298,412 | B2 * | 11/2007 | Sannoh et al. | 348/348 |
| 2004/0057713 | A1 * | 3/2004 | Ishikawa et al. | 396/89 |
| 2005/0185084 | A1 * | 8/2005 | Nonaka et al. | 348/345 |
| 2005/0264678 | A1 * | 12/2005 | Butterworth | 348/345 |
| 2006/0045507 | A1 * | 3/2006 | Takamiya | 396/111 |
| 2007/0041657 | A1 * | 2/2007 | Rychagov et al. | 382/274 |
| 2007/0242942 | A1 | 10/2007 | Nozaki et al. | |
| 2008/0007643 | A1 * | 1/2008 | Okumura | 348/333.01 |
| 2008/0107355 | A1 * | 5/2008 | Onuki | 382/284 |
| 2008/0198244 | A1 * | 8/2008 | Watarai | 348/241 |
| 2009/0016708 | A1 * | 1/2009 | Takeuchi | 396/104 |
| 2009/0022486 | A1 * | 1/2009 | Muramatsu | 396/104 |
| 2009/0135292 | A1 * | 5/2009 | Muramatsu | 348/349 |

(Continued)

FOREIGN PATENT DOCUMENTS

| JP | 02-074934 | 3/1990 |
| JP | 2002-182106 | 6/2002 |
| JP | 2007-199261 | 8/2007 |
| JP | 2007-286255 | 11/2007 |

OTHER PUBLICATIONS

Japanese Office Action for corresponding JP Application No. 2008-012347, Nov. 29, 2011.

Primary Examiner — Clayton E Laballe
Assistant Examiner — Linda B Smith
(74) Attorney, Agent, or Firm — Ditthavong Mori & Steiner, P.C.

(57) ABSTRACT

A focus detection device includes a focus detector, an object detector, a selector, a divider, and a controller. The focus detector is configured to detect a plurality of focus adjusting states at focus detecting positions in an image plane of an optical system. The object detector is configured to detect image information corresponding to a specified object in an image of the optical system. The selector is configured to select focus adjusting states among the plurality of focus adjusting states based on the image information detected by the object detector. The divider is configured to find variation in the selected focus adjusting states and configured to divide the selected focus adjusting states into a plurality of groups based on the variation. The controller is configured to find a final focus adjusting state based on a pre-final focus adjusting state in a group selected from the plurality of groups.

12 Claims, 6 Drawing Sheets

(56) References Cited

U.S. PATENT DOCUMENTS

2009/0153666 A1* 6/2009 Takeuchi et al. ............. 348/169
2009/0153693 A1* 6/2009 Onuki et al. ............... 348/222.1
2011/0234885 A1* 9/2011 Muramatsu ................... 348/345

* cited by examiner

| i | X |
|---|---|
| 1 | −0.16 |
| 2 | −0.14 |
| 3 | −0.10 |
| 4 | −0.12 |
| 5 | −0.18 |
| 6 | −0.20 |
| 7 | 0.18 |
| 8 | 0.20 |
| 9 | 0.12 |
| 10 | 0.14 |
| 11 | 0.10 |
| 12 | 0.16 |
| σ | 0.154 |

FIG.5A

| j | Y | i |
|---|---|---|
| 1 | −0.20 | 6 |
| 2 | −0.18 | 5 |
| 3 | −0.16 | 1 |
| 4 | −0.14 | 2 |
| 5 | −0.12 | 4 |
| 6 | −0.10 | 3 |
| 7 | 0.10 | 11 |
| 8 | 0.12 | 9 |
| 9 | 0.14 | 10 |
| 10 | 0.16 | 12 |
| 11 | 0.18 | 7 |
| 12 | 0.20 | 8 |

FOCUS DETECTION DEVICE, FOCUS DETECTION METHOD, AND CAMERA

CROSS-REFERENCE TO RELATED APPLICATIONS

The present application claims priority under 35 U.S.C. §119 to Japanese Patent Application No. 2008-012347, filed Jan. 23, 2008. The contents of this application are incorporated herein by reference in their entirety.

BACKGROUND OF THE INVENTION

1. Field of the Invention

The present invention relates to a focus detection device, a focus detection method, and a camera including the focus detection device.

2. Discussion of the Background

There has been known a focus detection device which detects focus adjusting states, that is, defocus amounts, of a photographing lens in a plurality of focus detecting areas set in a photographing screen, divides the defocus amounts into groups based on variation in the defocus amounts, and selects the optimum group which is expected to capture a main object from these groups (see Japanese Patent Application Laid-Open (JP-A) No. 2007-199261). The contents of Japanese Patent Application Laid-Open (JP-A) No. 2007-199261 are incorporated herein by reference in their entirety.

SUMMARY OF THE INVENTION

According to one aspect of the present invention, a focus detection device includes a focus detector, an object detector, a selector, a divider, and a controller. The focus detector is configured to detect a plurality of focus adjusting states at a plurality of focus detecting positions provided in an image plane of an optical system. The object detector is configured to detect image information corresponding to a specified object in an image of the optical system. The selector is configured to select selected focus adjusting states among the plurality of focus adjusting states based on the image information detected by the object detector. The divider is configured to find variation in the selected focus adjusting states and configured to divide the selected focus adjusting states into a plurality of groups based on the variation. The controller is configured to find a final focus adjusting state based on a pre-final focus adjusting state in a group selected from the plurality of groups.

According to another aspect of the present invention, a camera includes the focus detection device as described above. The camera further includes a focus adjuster configured to perform the focus adjustment of the optical system based on the final focus adjusting state determined by the controller.

According to further aspect of the present invention, a camera includes the focus detection device in which the plurality of focus adjusting states include defocus amounts of the image formed by the optical system. The controller of the focus detection device is configured to determine a final focus adjusting state based on an average value of the defocus amounts in a group selected from the plurality of groups. The camera further includes a focus adjuster configured to perform the focus adjustment of the optical system based on the final focus adjusting state determined by the controller. When the focus adjustment of the optical system is performed by the focus adjuster, focus detecting positions in which the defocus amount in a predetermined range is detected from the average value of the selected defocus amounts is displayed.

According to the other aspect of the present invention, a focus detection method includes detecting a plurality of focus adjusting states at a plurality of focus detecting positions provided in an image plane of an optical system. Image information is detected corresponding to a specified object in an image of the optical system. Focus adjusting states are selected among the plurality of focus adjusting states based on the image information detected by the object detector. Variation in the selected focus adjusting states is found. Based on the variation, the selected focus adjusting states are divided into a plurality of groups. A final focus adjusting state is found based on a pre-final focus adjusting state in a group selected from the plurality of groups.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Embodiments will now be described with reference to the accompanying drawings, wherein like reference numerals designate corresponding or identical elements throughout the various drawings.

Figure 1:
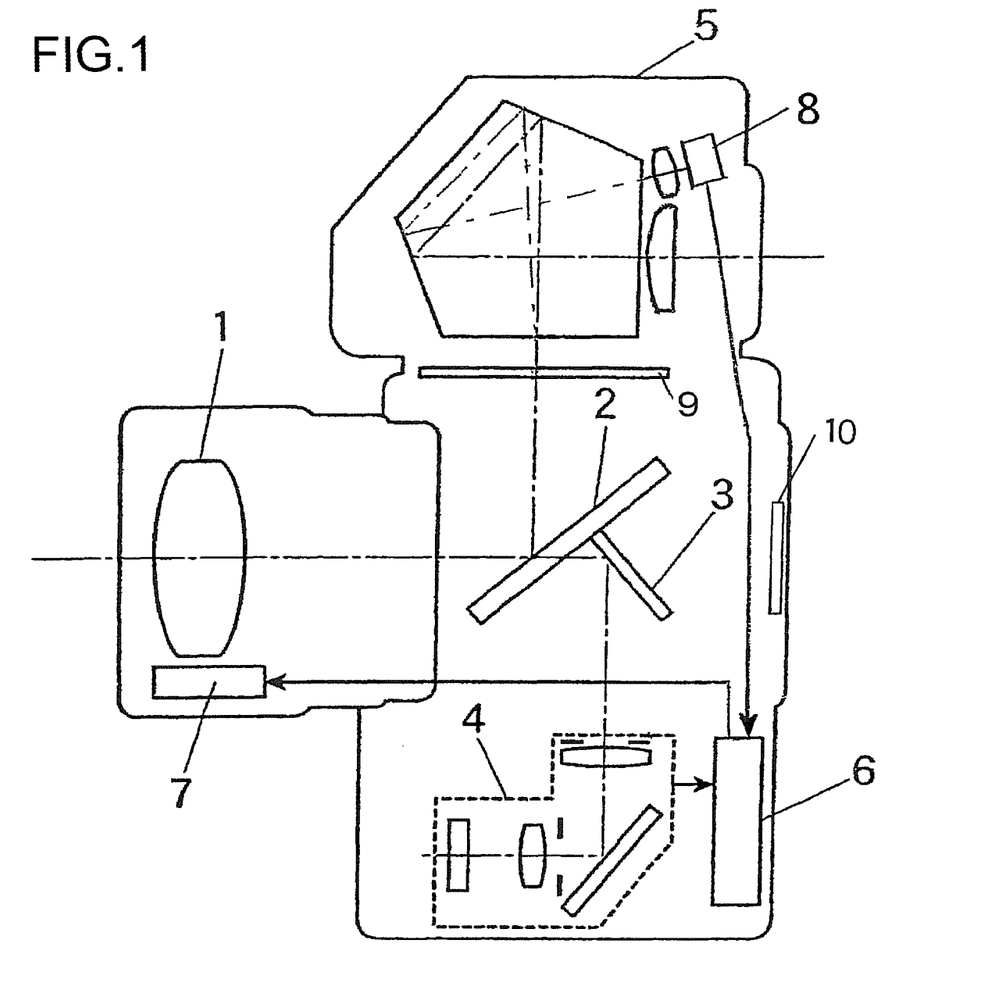
FIG. 1 is a diagram illustrating the configuration of a camera according to one embodiment.

A focus detection device according to an embodiment of the present invention applied to a single-lens reflex camera will be described. The present invention is not limited to the single-lens reflex camera. FIG. 1 is a cross-sectional view of a camera according to one embodiment. A photographing lens 1 which configures a photographing optical system is fitted in the camera. A light from an object passes through the photographing lens 1 and then a half mirror portion of a main mirror 2. The light is reflected on a sub-mirror 3 and is then guided to a focus detecting device 4. In addition, a light from the object passes through the photographing lens 1. The light is reflected on the main mirror 2 and is then guided to a finder 5 in the upper portion of the camera. An object image is focused onto a finder screen 9. The object image is identified by a photographer. As illustrated in the drawing, before photographing, the main mirror 2 and the sub-mirror 3 are placed in a photographing optical path. During photographing, the main mirror 2 and the sub-mirror 3 are hinged so as to be retracted from the photographing optical path. The image of the photographing lens 1 is imaged by an imaging device 10.

Part of the light from the object guided to the finder 5 is guided to a photometry device 8. The photometry device 8 has a light receiving device in which red (R), green (G), and blue (B) pixels are arrayed in a predetermined array pattern. The photometry device 8 detects the image of the photographing lens 1 focused onto the light receiving device to obtain color information of the object. The color information is outputted from the photometry device 8 to a controller 6. The color information is used for performing later-described human discrimination in the controller 6. That is, the photometry device 8 detects color information of the human image of the images of the photographing lens 1, and outputs the color information to the controller 6.

The controller 6 has a microcomputer and peripheral parts such as a memory, not illustrated, and performs various processes and control. Based on the color information outputted from the photometry device 8, the human discrimination which discriminates the human part from the images of the photographing lens 1 is performed. A focus adjusting state (defocus amount) of the photographing lens 1 is determined based on a focus detecting signal outputted from the focus detecting device 4. A lens driving device 7 is drivingly controlled based on the determined focus adjusting state to perform the focus adjustment of the photographing lens 1.

Figure 2:
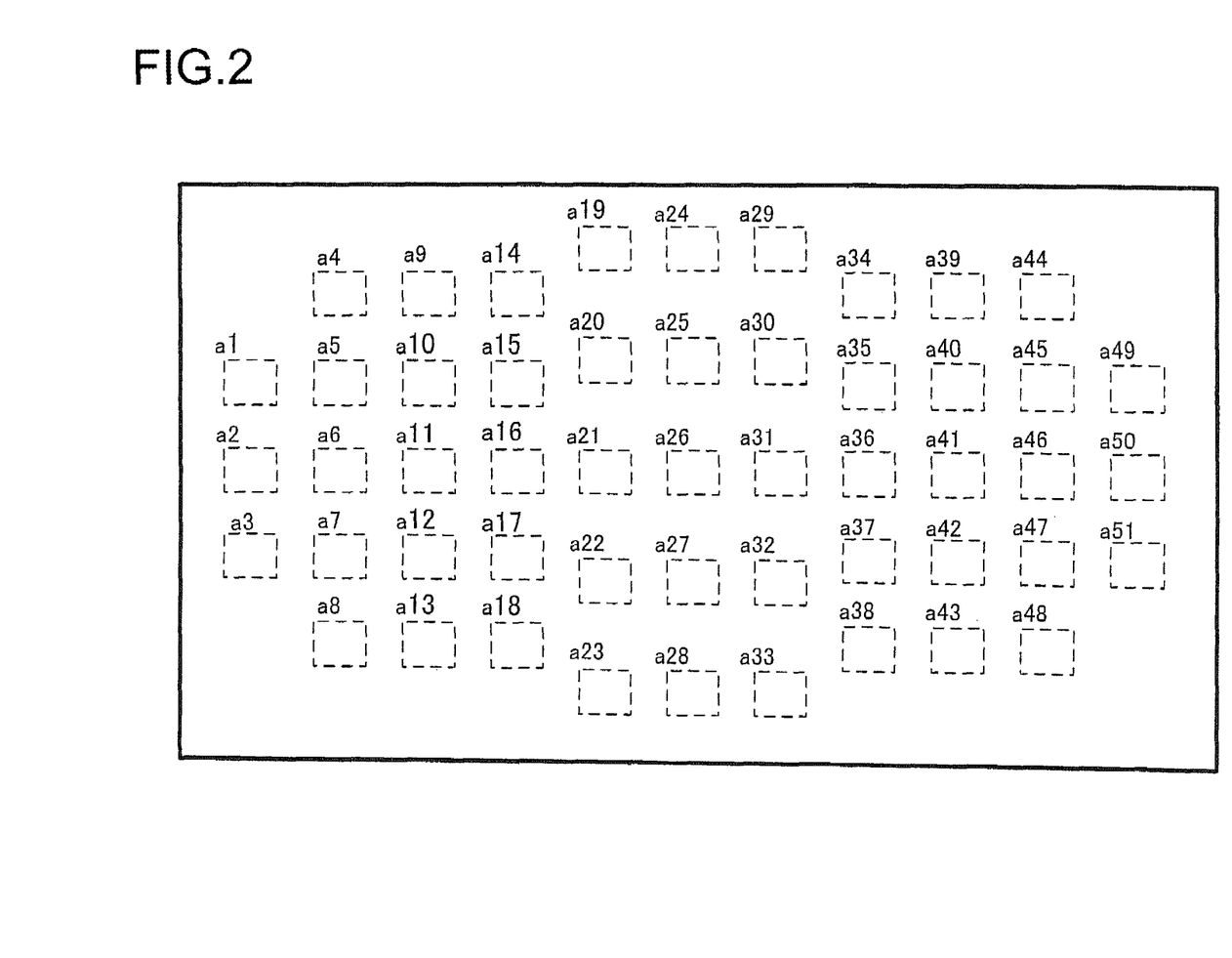
FIG. 2 is a diagram illustrating an arrangement example of focus detecting areas.
Figure 3:
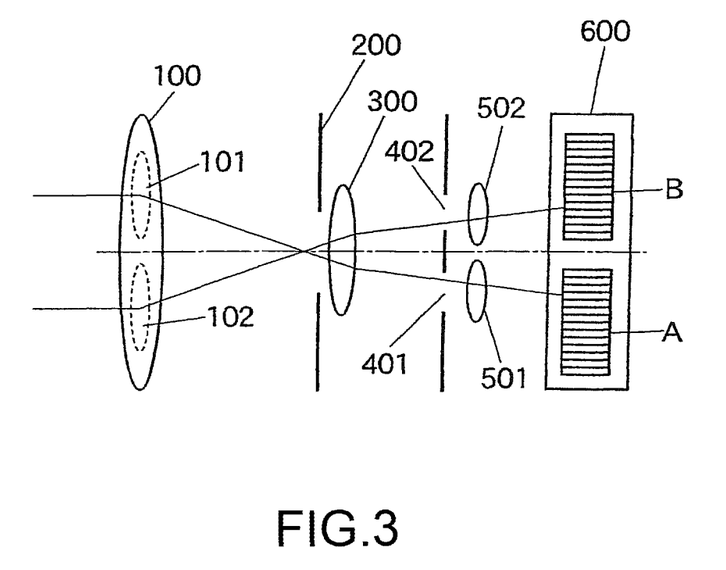
FIG. 3 is a diagram illustrating a focus detecting optical system.

As illustrated in FIG. 2, the focus detecting device 4 sets 51 focus detecting areas (focus detecting positions) in an image plane of the photographing lens 1. As illustrated in FIG. 2, the focus detecting areas are indicated by a1 to a51 from the upper left side to the lower right side. Each of the focus detecting areas has a focus detecting optical system indicated by the reference numerals 200 to 600 in FIG. 3. In FIG. 3, a light flux incident via a region 101 of a photographing optical system 100 corresponding to the photographing lens 1 of FIG. 1 passes through the field mask 200, the field lens 300, the diaphragm opening 401, and the re-focusing lens 501, and focused onto an A array of the image sensor array 600. The A array of the image sensor array 600 arrays a plurality of photoelectric conversion pixels which produce an output according to the intensity of incidence in one dimension. In the same manner, a light flux incident via a region 102 of the photographing optical system 100 passes through the field mask 200, the field lens 300, the diaphragm opening 402, and the re-focusing lens 502, and focused onto a B array of the image sensor array 600. The B array of the image sensor array 600 arrays a plurality of photoelectric conversion pixels which produce an output according to the intensity of incidence in one dimension.

A pair of object images focused onto the A array and the B array of the image sensor array 600 is moved away from each other in the state of front focusing in which the photographing optical system 100 focuses a sharp image of the object in front of a predetermined focal plane, while the pair is close to each other in the state of rear focusing in which the photographing optical system 100 focuses a sharp image of the object at the rear of the predetermined focal plane. The object images on the A array and the B array of the image sensor array 600 are located at a predetermined pitch at focusing in which the photographing optical system 100 focuses the sharp image of the object onto the predetermined focal plane. The pair of object images are photoelectrically converted to electric signals by the A array and the B array of the image sensor array 600. The signals are computed by the controller 6 to determine the amount of shift of relative positions of the pair of object images. A focus adjusting state of the photographing optical system 100 is thus found. Here, the amount of shift of the predetermined focal plane from the focusing plane and its direction (hereinafter, called a defocus amount) are found.

A method of performing the focus adjustment of the photographing lens 1 from a defocus amount determined in each of the focus detecting areas will be described. In the camera of this embodiment, the controller 6 judges, based on color information outputted from the photometry device 8, whether or not a human exists in each of the focus detecting areas a1 to a51 set in the photographing screen by the focus detecting device 4. That is, the controller 6 judges whether or not the color information corresponding to each of the focus detecting areas a1 to a51 represents the feature of the human, e.g., the feature of his/her face, head, or skin. If the controller 6 judges that the color information represents such feature, the human is judged to exist in the focus detecting area. The human part is discriminated from the images of the photographing lens 1 to perform the human discrimination. The focus detecting area in which the human is judged to exist will be called a human area.

Once the human areas are specified by the human discrimination, then the controller 6 divides a plurality of defocus amounts detected in the human areas into groups. The defocus amounts detected in the focus detecting areas other than the human areas are not divided into groups. The method of dividing the plurality of defocus amounts detected in the human areas into groups will be described.

Various objects other than the main object intended by the photographer are included in the image plane of the photographing lens 1. The plurality of defocus amounts detected in the human areas which capture the same human (object) need to be included in the same group.

There will be considered a photographing scene in which a plurality of humans stand in different positions from the camera and an object which is not a main object exists in front of the plurality of humans. In the photographing scene, the focus adjustment of the photographing lens 1 onto the front object which is not the main object need to be prevented. In this embodiment, as described above, only the defocus amounts detected in the human areas which capture the humans are divided into groups. The defocus amounts detected in the focus detecting areas other than the human areas are not divided into groups.

In the photographing scene, the defocus amounts of the humans, that is, the defocus amounts detected in the human areas corresponding to the humans need to be divided into different groups. The difference between the defocus amounts of the humans is different depending on the photographing distance. If the photographing distance is long, the difference between the defocus amounts is small. If the photographing distance is short, the difference between the defocus amounts is large.

The defocus amounts of the humans can be divided into groups by using a predetermined fixed defocus width, since the difference between the defocus amounts is large when the photographing distance is short. However, since the difference between the defocus amounts is small when the photographing distance is long, it makes difficult to accurately divide the defocus amounts of the humans into different groups. As a result, the defocus amount of a human may include the defocus amount of a different human. In such a case, the proper defocus amount cannot be obtained to lower the focus detecting accuracy.

The problem about grouping is also caused due to the difference between the focal distances of the photographing lens. Even if being the same photographing distance, when the focal distance of the photographing lens is short, the difference between the defocus amounts of the different objects is small, on the other hand, when the focal distance is long, the difference between the defocus amounts of the different objects is large. Therefore, if the grouping is performed using the predetermined fixed defocus width, since the difference between the defocus amounts is large in the photographing lens whose focal distance is long, the defocus amounts of the humans can be accurately divided into different groups. However, since the difference between the defocus amounts is small in the photographing lens whose focal distance is short, it makes difficult to accurately divide the defocus amounts of the humans into different groups, and the defocus amount of a human may include the defocus amount of a different human. In such a case, the proper defocus amount cannot be obtained to lower the focus detecting accuracy.

In this embodiment, regardless of the photographing conditions such as the photographing distance and the focal distance of the photographing lens 1, the grouping is performed such that only the defocus amounts detected in the human areas which capture the same human are accurately included in the same group. The grouping method will be described below.

Of the defocus amounts detected in the 51 focus detecting areas a1 to a51 illustrated in FIG. 2, the defocus amounts of the human areas specified by the human discrimination based on color information from the photometry device 8 are represented by $X_i$ (i=1 to N). Here, N represents the number of effective data and is equal to the number of the human areas. Since the effective defocus amounts are not always detected in all the human areas, when there are the focus-undetectable human areas and the human areas which have low reliability of the obtained defocus amounts, the defocus amounts of the human areas may be excluded. In this case, N is smaller than the number of the human areas.

The controller 6 determines a variance v of the effective N data, that is, the set of N defocus amounts of the reliable human areas by the following equation.

$$v = \Sigma(X_i - X\text{ave})^2/N \quad (1)$$

In the (1) equation, Xave is the average value of the N defocus amounts, and $\Sigma$ is the total of i=1 to N.

The controller 6 determines a standard deviation $\sigma$ as an amount representing the variation degree of the set of the N defocus amounts by the following equation.

$$\sigma = \sqrt{(v)} \quad (2)$$

Using the standard deviation $\sigma$ representing the variation degree of the set determined by the (2) equation, the controller 6 further determines a defocus width H for dividing the N defocus amounts $X_i$ (i=1 to N) into groups by the following equation.

$$H = \alpha \cdot \sigma \quad (3)$$

In the (3) equation, $\alpha$ is a coefficient and is typically about 0.4 to about 0.6.

Figure 4:
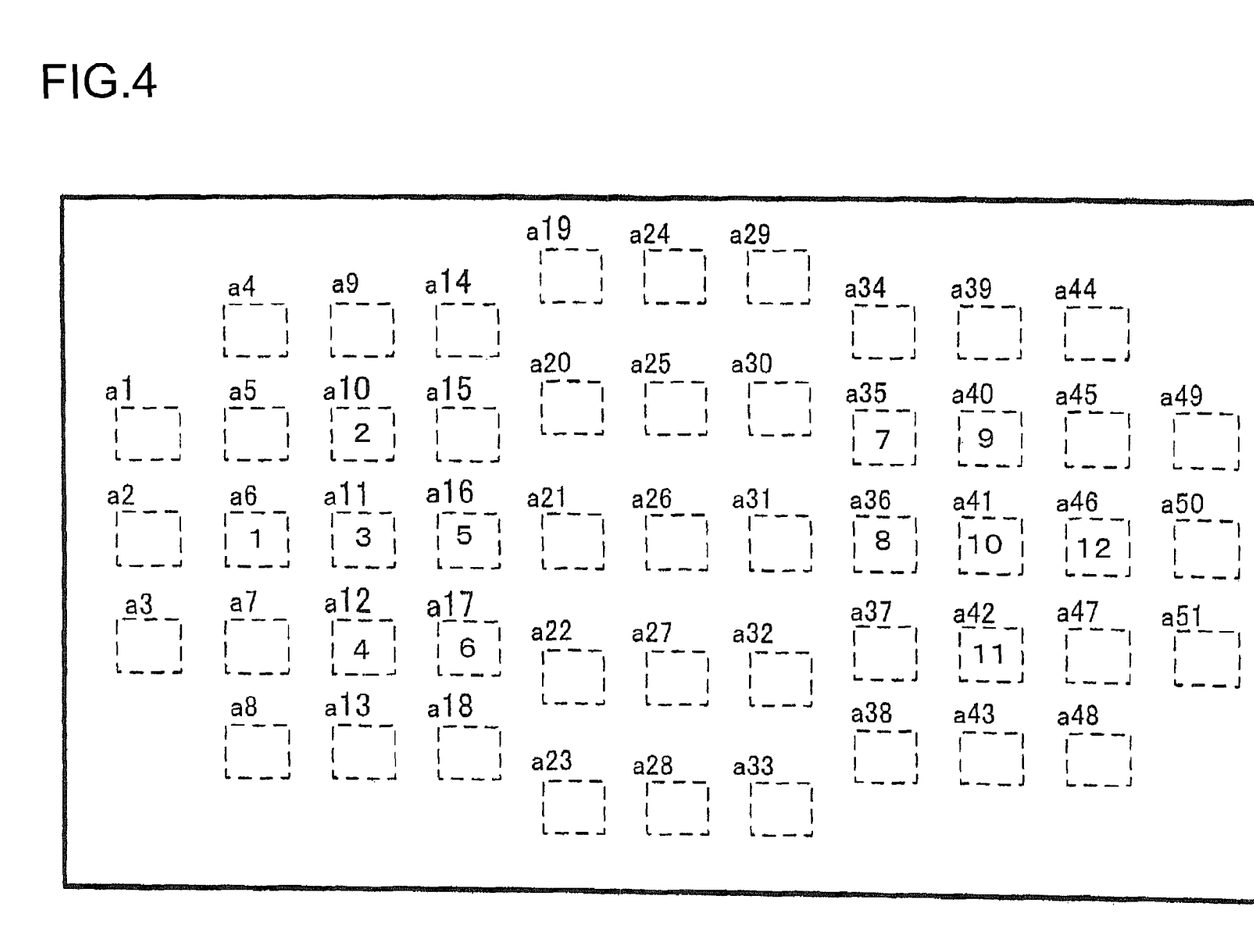
FIG. 4 is a diagram illustrating an example of human areas.

Using the grouping defocus width H, the controller 6 divides the defocus amounts of the human areas into groups by the following procedure. For example, of the 51 focus detecting areas a1 to a51, the a6, a10, a11, a12, a16, a17, a35, a36, a40, a41, a42, and a46 focus detecting areas are assumed to be discriminated as the human areas. As illustrated in FIG. 4, the 12 human areas sequentially coincide with the numbers 1 to 12. The N (in this example, 12) defocus amounts $X_i$ (i=1 to N) shown in the table of FIG. 5A are assumed to be detected in the human areas 1 to 12.

Figure 5A:
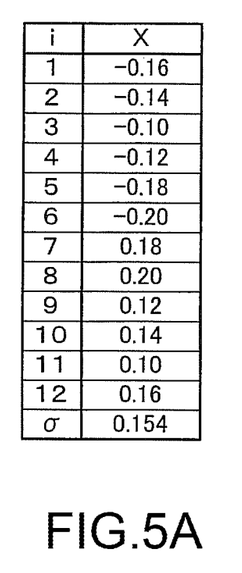
FIGS. 5A and 5B are tables illustrating an example of defocus amounts detected in the human areas.
Figure 5B:
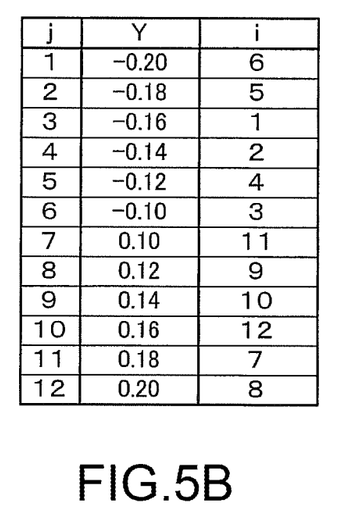

The controller 6 arranges the defocus amounts $X_i$ of FIG. 5A in increasing order and then determines arrays $Y_i$ (i=1 to N) shown in the table of FIG. 5B. Since the focus detecting device 4 detects the smaller defocus amount as the object is closer to the camera, the arrangement of the defocus amounts in increasing order means the arrangement of the plurality of humans captured in the human areas in the order in which the humans are close to the camera 1.

If the difference between the two adjacent defocus amounts in the arrays $Y_i$ is larger than the grouping defocus width H, the controller 6 judges that there is a grouping boundary between the two defocus amounts. That is, $$|Y_{i+1} - Y_i| > H \quad (4)$$

When the discriminant (4) is true, the grouping boundary is set between the defocus amounts $Y_i$ and $Y_{i+1}$. A plurality of grouping boundaries may exist in the N defocus amounts $Y_i$. When all the differences between the two adjacent defocus amounts of the N defocus amounts $Y_i$ are equal to or less than the defocus width H, all the N defocus amounts $Y_i$ belong to the same group.

By the tables illustrated in FIGS. 5A and 5B, the grouping procedure will be specifically described. The standard deviation $\sigma$ of the N defocus amounts $X_i$ is $\sigma=0.154$ from the (1) and (2) equations. If the coefficient $\alpha$ is 0.5, the grouping defocus width H is H=0.077 from the (3) equation. In the arrays $Y_i$ in which the N defocus amounts $X_i$ are arranged in increasing order (FIG. 5B), the grouping boundary is checked from the discriminant (4), and the difference between the adjacent defocus amounts which is larger than the defocus width H is between Y6 and Y7. The grouping boundary is thus assumed to be between the adjacent defocus amounts. As a result, the N defocus amounts of the arrays $Y_i$ (FIG. 5B) are divided into the group of Y1, Y2, Y3, Y4, Y5, and Y6 and the group of Y7, Y8, Y9, Y10, Y11, and Y12. The N defocus amounts of the arrays $X_i$ are divided into the group of X6, X5, X1, X2, X4, and X3 and the group of X11, X9, X10, X12, X7, and X8.

Figure 6:
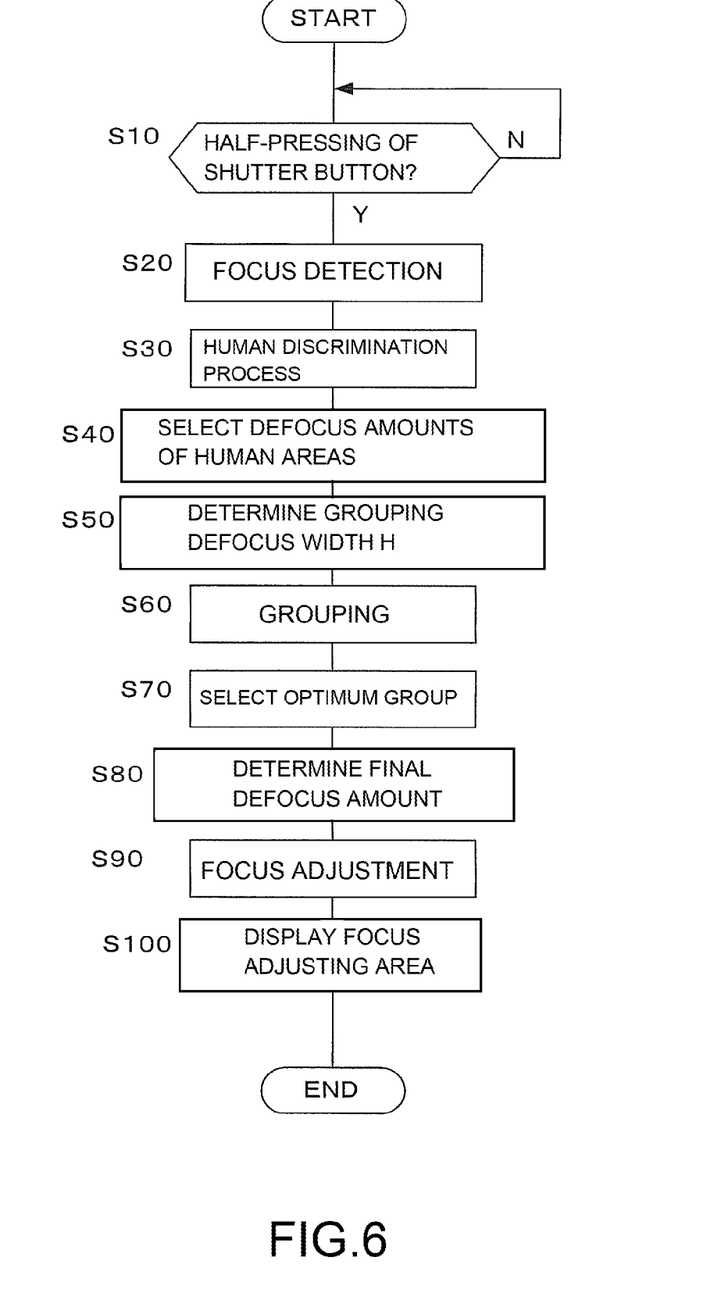
FIG. 6 is a flowchart illustrating a focus adjusting operation according to one embodiment.

FIG. 6 is a flowchart illustrating a focus adjusting operation according to one embodiment. The microcomputer of the controller 6 repeatedly executes the operation while the camera is turned on. In step 10, the controller 6 judges whether or not a shutter button (not illustrated) provided in the camera is half-pressed by the user. When the shutter button is half-pressed, the process is advanced to step S20.

In step S20, the controller 6 computes the defocus amounts in the focus detecting areas a1 to a51 based on the focus detecting signals outputted from the focus detecting device 4 to perform the focus detection. The defocus amounts of the images of the photographing lens 1 which show a plurality of focus adjusting states of the photographing lens 1 are thus detected in the plurality of focus detecting areas a1 to a51.

In step S30, the controller 6 executes the human discrimination process. The controller 6 judges, based on color information outputted from the photometry device 8, whether or not each of the focus detecting areas a1 to a51 is the human area, that is, the focus detecting area in which the human exists, and then specifies the human areas.

In step S40, of the defocus amounts determined in the focus detecting areas a1 to a51 in step S20, the controller 6 selects the defocus amounts of the human areas specified in step S30 as objects for grouping. The defocus amounts in the focus detecting areas other than the human areas, which are not selected here, are not selected for grouping.

Although, in the above description, the defocus amounts are detected in all the focus detecting areas a1 to a51 in step S20 and the defocus amounts of the human areas are selected from the defocus amounts in step S40, only the defocus amounts of the human areas may be detected. That is, after the human areas are specified by the human discrimination process in step S30, the focus detection in step S20 is executed to only the human areas to detect the defocus amounts of the human areas. The number of steps of the defocus amounts computing process can be thus reduced to improve the efficiency.

In step S50, the controller 6 determines the grouping defocus width H by the above procedure based on the defocus amounts of the human areas selected in step S40. That is, the standard deviation σ is determined based on the N effective defocus amounts Xi of the human areas, and this is assumed to be variation in the defocus amounts Xi. Based on the thus determined variation (the standard deviation σ), the defocus width H corresponding to a variation range which divides the defocus amounts Xi of the human areas into a plurality of groups is determined.

In step S60, the controller 6 uses the grouping defocus width H determined in step S50 to divide the defocus amounts Xi of the human areas selected in step S40 into groups. That is, when the difference between the two adjacent defocus amounts is equal to or less than the grouping defocus width H, the two defocus amounts are included in the same group. On the other hand, when the difference between the two adjacent defocus amounts is larger than the grouping defocus width H, there assumed to be the grouping boundary between the two defocus amounts, and the two adjacent defocus amounts are then divided into different groups. Based on the standard deviation σ determined in step S50 as the variation in the defocus amounts Xi, the defocus amounts Xi of the human areas are thus divided into a plurality of groups.

In step S70, the controller 6 selects the optimum group from the groups of the defocus amounts divided in step S60. The optimum group selection method can apply the known method. The closest defocus amount group in which the possibility of capturing the main object is high is selected as the optimum group.

In step S80, the controller 6 determines the final defocus amount based on the defocus amounts belonging to the optimum group selected in step S70. In this embodiment, the final defocus amount is determined by the average value of a plurality of defocus amounts belonging to the selected optimum group.

In step S90, the controller 6 drivingly controls the lens driving device 7 based on the final defocus amount determined in step S80 to perform the focus adjustment of the photographing lens 1.

In step S100, the controller 6 displays the focus adjusting area. Of the focus detecting areas a1 to a51, the human area in which the final defocus amount determined in step S80, that is, the defocus amount in a predetermined range from the average value of the plurality of defocus amounts belonging to the optimum group, is detected is displayed as the focus adjusting area. The focus adjusting area is superimposed on the object image by the finder 5 and is then displayed. When the focus adjustment of the photographing lens 1 is performed in step S90, the focus adjusting area is displayed. After the execution of Step S100, the controller 6 ends the flowchart of FIG. 6.

According to the above embodiment, the following operation and effects can be exerted.

(1) In the camera of this embodiment, the photometry device 8 detects color information of the human image of the images of the photographing lens 1. The controller 6 detects a plurality of defocus amounts of the photographing lens 1 in the plurality of focus detecting areas a1 to a51 set in the image plane of the photographing lens 1 based on the focus detecting signals from the focus detecting device 4 (step S20). The human discrimination process is performed based on color information detected by the photometry device 8 (step S30), the defocus amounts of the human areas specified by the human discrimination process are selected (step S40), thereby, of the plurality of defocus amounts detected in step S20, the defocus amounts detected in the focus detecting areas which capture the human is selected. Variation in the plurality of selected defocus amounts is determined to determine the grouping defocus width H based on the variation (step S50). Using this, the defocus amounts are divided into groups (step S60), and thereby the defocus amounts are divided into a plurality of groups. The optimum group is selected from the plurality of groups (step S70). The final defocus amount is determined based on the defocus amounts belonging to the selected optimum group (step S80). Thus, when the main object is the human, the plurality of focus adjusting states can be appropriately divided into groups.

(2) In step S50, the grouping defocus width H in the variation range which divides the defocus amounts of the human areas selected in step S40 into a plurality of groups is determined based on the variation in the defocus amounts. The standard deviation σ of the defocus amounts of the human areas is determined, and this is assumed to be variation in the defocus amounts. In step S60, the defocus width H is used to divide the defocus amounts of the human areas into groups. The grouping can be accurately performed such that the defocus amounts of the human areas which capture the same object (human) belong to the same group according to the variation degree of the defocus amounts.

(3) In step S80, the average value of the defocus amounts belonging to the optimum group selected in step S70 is determined as the final defocus amount. The focus adjustment can be performed appropriately according to the human as the main object.

(4) When the focus adjustment of the photographing lens is performed in step S90, the focus detecting area in which the final defocus amount determined in step S80 is detected, that is, the defocus amount in the predetermined range is detected from the average value of the defocus amounts belonging to the optimum group is displayed as the focus adjusting area (step S100). The photographer can easily identify onto what part in the photographing screen the focus adjustment is performed.

<<A Modification of One Embodiment>>

Although, in the above embodiment, the standard deviation σ of the set is used as the amount which represents the variation degree of the plurality of defocus amounts detected in the plurality of focus detecting areas, a parameter other than the standard deviation may be used as the amount which represents the variation degree of the set of the defocus amounts. The average value σ' of an absolute value of deviation of the set of the defocus amounts from the average value Xave, expressed by the following equation, may be used as the amount which represents the variation degree of the set of the defocus amounts.

$$\sigma' = \Sigma |Xi - Xave|/N \quad (5)$$

In the (5) equation, N represents the number of effective data, and Σ represents the total of i=1 to N.

Although, in the above embodiment, the focus adjusting state of the photographing lens is detected by the focus detecting device independently of the imaging device, the focus detection may be performed based on an output of a focus detecting device which has a focus detecting pixel in an imaging pixel array of the imaging device. The focus detecting pixel has a micro-lens and one or more photoelectric conversion units and receives a pair of light fluxes which have passed through different pupil regions of the photographing lens. The focus detection of the pupil division type is performed by light receiving signals of the pair of light fluxes.

Although, in the above embodiment, color information of the human image is detected to perform the human discrimination, needless to say, the object to be judged is not limited to the human and may be an animal, a plant, or an industrial product. In any case, the object is detected by detecting color information corresponding to a specified object.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A focus detection device comprising:
   a focus detector configured to detect a plurality of focus adjusting states at a plurality of focus detecting positions provided in an image plane of an optical system;
   an object detector configured to detect image information including color information of a specified object in an image of the optical system;
   a selector configured to select selected focus adjusting states among the plurality of focus adjusting states based on the image information detected by the object detector, wherein only focus adjusting states at focus detecting positions at which the specified object is detected are selected as selected focus adjusting states and wherein all of the focus adjusting states at the focus detecting positions at which the specified object is detected are selected as the selected focus adjusting states;
   a divider configured to find variation in the selected focus adjusting states and configured to divide the selected focus adjusting states into a plurality of groups based on the variation; and
   a controller configured to find a final focus adjusting state based on a pre-final focus adjusting state in a group selected from the plurality of groups,
   wherein the plurality of focus adjusting states comprise defocus amounts of the image formed by the optical system, and
   wherein the divider is configured to find an average value of an absolute value of deviation from the average value of the plurality of selected defocus amounts selected by the selector.

2. The focus detection device according to claim 1, wherein the divider is configured to determine a variation range and divide the selected focus adjusting states into the plurality of groups by using the variation range.

3. The focus detection device according to claim 1, wherein the divider is configured to find the variation in the selected focus adjusting states by calculating a standard deviation of selected defocus amounts selected by the selector.

4. The focus detection device according to claim 1, wherein the controller is configured to determine a final focus adjusting state based on an average value of the defocus amounts in a group selected from the plurality of groups.

5. A camera comprising:
   the focus detection device according to claim 1; and
   a focus adjuster configured to perform the focus adjustment of the optical system based on the final focus adjusting state determined by the controller.

6. A camera comprising:
   the focus detection device according to claim 4; and
   a focus adjuster configured to perform the focus adjustment of the optical system based on the final focus adjusting state determined by the controller,
   wherein when the focus adjustment of the optical system is performed by the focus adjuster, focus detecting positions in which the defocus amount in a predetermined range is detected from the average value of the selected defocus amounts are displayed.

7. The focus detection device according to claim 1, wherein the object detector is configured to detect image information corresponding to a human as the specified object in the image.

8. A focus detection method comprising:
   detecting a plurality of focus adjusting states at a plurality of focus detecting positions provided in an image plane of an optical system;
   detecting image information including color information of a specified object in an image of the optical system;
   selecting, using a selector, selected focus adjusting states among the plurality of focus adjusting states based on the image information detected by the object detector, wherein only focus adjusting states at focus detecting positions at which the specified object is detected are selected as selected focus adjusting states and wherein all of the focus adjusting states at the focus detecting positions at which the specified object is detected are selected as the selected focus adjusting states;
   finding variation in the selected focus adjusting states;
   dividing, using a divider, the selected focus adjusting states into a plurality of groups based on the variation; and
   finding a final focus adjusting state based on a pre-final focus adjusting state in a group selected from the plurality of groups,
   wherein the plurality of focus adjusting states comprise defocus amounts of the image formed by the optical system, and
   wherein the divider is configured to find an average value of an absolute value of deviation from the average value of the plurality of selected defocus amounts selected by the selector.

9. The focus detection method according to claim 8, wherein the detected image information corresponds to a human as the specified object in the image.

10. A focus detection device comprising:
    means for detecting a plurality of focus adjusting states at a plurality of focus detecting positions provided in an image plane of an optical system;
    object detecting means for detecting image information including color information of a specified object in an image of the optical system;
    selecting means for selecting selected focus adjusting states among the plurality of focus adjusting states based on the image information detected by the object detecting means, wherein only focus adjusting states at focus detecting positions at which the specified object is detected are selected as selected focus adjusting states and wherein all of the focus adjusting states at the focus detecting positions at which the specified object is detected are selected as the selected focus adjusting states;
    finding means for finding variation in the selected focus adjusting states;
    dividing means for dividing the selected focus adjusting states into a plurality of groups based on the variation; and
    controlling means for finding a final focus adjusting state based on a pre-final focus adjusting state in a group selected from the plurality of groups,
    wherein the plurality of focus adjusting states comprise defocus amounts of the image formed by the optical system, and
    wherein the dividing means is configured to find an average value of an absolute value of deviation from the average value of the plurality of selected defocus amounts selected by the selecting means.

11. The focus detection device according to claim 10, wherein the object detecting means is configured to detect image information corresponding to a human as the specified object in the image.

12. A focus detection device comprising:
a focus detector configured to detect a plurality of focus adjusting states at a plurality of focus detecting positions provided in an image plane of an optical system;
an object detector configured to detect image information including color information of a specified object in an image of the optical system;
a selector configured to select selected focus adjusting states among the plurality of focus adjusting states based on the image information detected by the object detector, wherein only focus adjusting states at focus detecting positions at which the specified object is detected are selected as selected focus adjusting states and wherein all of the focus adjusting states at the focus detecting positions at which the specified object is detected are selected as the selected focus adjusting states;
a divider configured to find variation in the selected focus adjusting states and configured to divide the selected focus adjusting states into a plurality of groups based on the variation; and
a controller configured to find a final focus adjusting state based on a pre-final focus adjusting state in a group selected from the plurality of groups,
wherein the plurality of focus adjusting states comprise defocus amounts of the image formed by the optical system, and
wherein the divider is configured to find the variation in the selected focus adjusting states based on a difference between an average value of the defocus amounts and each of the defocus amounts.

* * * * *